US008397128B1

(12) United States Patent
Alonzo et al.

(10) Patent No.: US 8,397,128 B1
(45) Date of Patent: Mar. 12, 2013

(54) DATA LOAD INTO AN ASSET MANAGEMENT SYSTEM

(75) Inventors: Jason Aron Alonzo, Fair Oaks, CA (US); John Leong Yee, San Mateo, CA (US); Umesh Madhav Apte, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 941 days.

(21) Appl. No.: 12/432,163

(22) Filed: Apr. 29, 2009

(51) Int. Cl.
*G06F 11/00* (2006.01)

(52) U.S. Cl. ........................................ 714/759; 714/4.1

(58) Field of Classification Search .................. 714/759, 714/760, 755, 758; 718/100, 101, 105; 709/223
See application file for complete search history.

(56) References Cited

U.S. PATENT DOCUMENTS

| | | | |
|---|---|---|---|
| 7,337,148 B2 | 2/2008 | Xie et al. | |
| 7,457,791 B1 | 11/2008 | Garg et al. | |
| 2002/0052791 A1 | 5/2002 | Defede et al. | |
| 2003/0165230 A1 | 9/2003 | Reuss | |
| 2003/0220747 A1 | 11/2003 | Vailaya et al. | |
| 2003/0225692 A1 | 12/2003 | Bosch et al. | |
| 2003/0233287 A1* | 12/2003 | Sadler et al. ..................... | 705/28 |
| 2004/0215544 A1 | 10/2004 | Formale et al. | |
| 2005/0002380 A1* | 1/2005 | Miller et al. .................. | 370/352 |
| 2005/0102211 A1 | 5/2005 | Freeny | |
| 2005/0114502 A1 | 5/2005 | Raden et al. | |
| 2006/0022048 A1 | 2/2006 | Johnson | |
| 2006/0080656 A1 | 4/2006 | Cain et al. | |
| 2006/0116842 A1 | 6/2006 | Tarantola et al. | |
| 2006/0129415 A1 | 6/2006 | Thukral et al. | |
| 2006/0178954 A1 | 8/2006 | Thukral et al. | |
| 2006/0259392 A1 | 11/2006 | Rabenold et al. | |
| 2006/0265408 A1* | 11/2006 | Pini ................................ | 707/100 |
| 2006/0265503 A1 | 11/2006 | Jones et al. | |
| 2006/0288014 A1 | 12/2006 | Edwards et al. | |

OTHER PUBLICATIONS

U.S. Appl. No. 11/848,588, pp. 35.
Office Action dated Jan. 8, 2009 in U.S. Appl. No. 11/848,588, pp. 23.
Amendment dated Jul. 8, 2009 in U.S. Appl. No. 11/848,588, pp. 12.
Final Office Action dated Nov. 12, 2009 in U.S. Appl. No. 11/848,588, pp. 33.
Amendment after Final Office Action dated Apr. 12, 2010 in U.S. Appl. No. 11/848,588, pp. 16.
Advisory Action and Instructions not to enter Amendment after Final Office Action dated Apr. 29, 2010 in U.S. Appl. No. 11/848,588, pp. 5.
Amendment dated May 12, 2010 in U.S. Appl. No.11/848,588, pp. 14.
Office Action dated Aug. 5, 2010 in U.S. Appl. No. 11/848,588, pp. 28.
Amendment dated Nov. 5, 2010 in U.S. Appl. No. 11/848,588, pp. 17.

(Continued)

*Primary Examiner* — Dieu-Minh Le
(74) *Attorney, Agent, or Firm* — Silicon Valley Patent Group LLP; Omkar Suryadevara

(57) ABSTRACT

Asset data is loaded or entered into an asset management system using a Web service or a manual load, or both. The asset data may be discovered using a third-party asset discovery application. As a first loading option, an inbound asynchronous Web service is used to process the discovered data. As a second loading option, exposed tables are used for loading discovered data and processing through a run control. These entry points provide for additional data validation and error handling of invalid data. They provide ways for data to enter the asset management system and can also streamline the data integration, the reconciliation processes, and additionally automatically address or fix specific exceptions.

25 Claims, 10 Drawing Sheets

OTHER PUBLICATIONS

Final Office Action dated Feb. 3, 2011 in U.S. Appl. No. 11/848,588, pp. 29.
Amendment dated Jun. 3, 2011 in U.S. Appl. No. 11/848,588, pp. 11.
Examiner's Interview Summary dated Jun. 8, 2011 in U.S. Appl. No. 11/848,588, pp. 4.
Copy of U.S. Appl. No. 11/774,969, pp. 25.
Office Action dated Jul. 23, 2009 in U.S. Appl. No. 11/774,969, pp. 15.
Amendment dated Oct. 24, 2009 in U.S. Appl. No. 11/774,969, pp. 9.
Final Office Action dated Feb. 19, 2010 in U.S. Appl. No. 11/774,969, pp. 28.
Amendment after Final Office Action dated May 19, 2010 in U.S. Appl. No. 11/774,969, pp. 17.
Advisory Action dated Jun. 2, 2010 in U.S. Appl. No. 11/774,969, pp. 4.
Amendment dated Jun. 21, 2010 in U.S. Appl. No. 11/774,969, pp. 11.
Office Action dated Nov. 8, 2010 in U.S. Appl. No. 11/774,969, pp. 29.
Amendment dated Nov. 18, 2010 in U.S. Appl. No. 11/774,969, pp. 11.
Final Office Action dated Jan. 27, 2011 in U.S. Appl. No. 11/774,969, pp. 31.
Amendment dated Jun. 26, 2011 in U.S. Appl. No. 11/774,969, pp. 12.
Examiner's Interview Summary dated Jun. 29, 2011 in U.S. Appl. No. 11/774,969, pp. 4.
Notice of Allowance dated Sep. 7, 2011 in U.S. Appl. No. 11/774,969, pp. 18.
Applicant's Initiated Interview Summary dated Nov. 2, 2011 in U.S. Appl. No. 11/774,969, pp. 3.
Comments on Notice of Allowance and Statement of Substance of Interviews dated Dec. 7, 2011 in U.S. Appl. No. 11/774,969, p. 1.
U.S. Appl. No. 13/346,143, pp. 26.

* cited by examiner

DATA LOAD INTO AN ASSET MANAGEMENT SYSTEM

BACKGROUND OF THE INVENTION

This invention relates to the field of inventory management and more specifically, to a specific technique of integrating discovered inventory data from third-party discovery applications to an asset management system.

Large organizations often have trouble keeping track of their assets. The assets are purchased and deployed throughout the organization and then become increasingly difficult to account for. Accounting of these assets is necessary to maintain compliance with regard to leases, material financial impact of the assets, and software license compliance among other things. Increasingly, organizations are deploying asset tracking (i.e., physical or automatic discovery) mechanisms that can retrieve the actual asset information as it is utilized in the organization.

The asset tracking data is typically stored at the organization's site. Organizations want to take the information that comes from the physical discovery and load or integrate the discovery data into the asset management system.

One approach uses a generic XML structure to integrate discovery applications' inventory data using a request-response model. This model of integration with discovery applications' inventory data has a user or third-party vendor build out a process to consume the request and produce a response. To use the request-response model, the discovery application vendor would need to understand the request, parse through the terms in the request, query their system, and produce the results in the response.

Typically, very few discovery applications provide functionality to work with the request-response model and asset management system. This may be for various reasons, such as the discovery application vendors may not want to invest the time or resources to build out their half of this model. So, when a customer purchases the asset management system and wishes to use a discovery application without a prebuilt connector for the request-response model, the customer generally has to hire a systems integrator to build a custom integration.

Therefore, there is a need for a solution that will lower the total cost of ownership by removing the need for the third-party discovery vendor (or systems integrator) to provide an XML connector to process the existing request in the current request-response model. Error handling provides better data management as data entering the system from third parties can be corrected locally without having to be resubmitted. The new functionality leverages existing functionality to ensure a complete end-to-end process from the discovery data entering the asset management system through to reconciliation of that data against the asset repository.

Therefore, there is a need for a technique of using a Web service or a manual load to facilitate the integration of discovery data into the asset management system.

BRIEF SUMMARY OF THE INVENTION

Asset data is loaded or entered into an asset management system using a Web service or a manual load, or both. The asset data may be discovered using a third-party asset discovery application. As a first loading option, an inbound asynchronous Web service is used to process the discovered data. As a second loading option, exposed tables are used for loading discovered data and processing through a run control. These entry points provide for additional data validation and error handling of invalid data. They provide ways for data to enter the asset management system and can also streamline the data integration, the reconciliation processes, and additionally automatically address or fix specific exceptions.

In an implementation, inventory data from third-party discovery applications is integrated into an asset management system. An asset information gathering process of loading discovered asset data into prestaging tables is employed using a Web service or a manual load or any combination of the two. Once the data is in the prestaging tables, the data is loaded into staging tables. Once the data is in the staging tables, the data can be loaded into application tables.

This invention removes the need for a request-response integration model. The XML integration will be supported by two methods, the first (option 1) is a one-way, inbound, asynchronous, XML Web service (PROCESS_DISCOVERY-DATA) and the second (option 2) is the creation of external staging tables (prestaging tables) for manual loading.

Once the data is published using the Web service, (1) the discovered inventory data will be integrated into the asset management system prestaging tables. (2) A prevalidation process will start to validate the data composition before moving the data to existing staging tables as input for the existing processes. (3) The XML contains a node (STREAMLINE_FLG) that can be used to automatically submit the reconciliation/comparison engine so that once the prevalidation is complete, the method can leverage the existing functionality.

When data is (1) manually populated to the prestaging tables, a run control should be executed. (2) The run control will initiate a prevalidation process to validate the data composition before moving the data to existing staging tables as input for the existing processes. (3) The run control contains a flag (STREAMLINE_FLG) that can be used to automatically submit the reconciliation/comparison engine so that once the prevalidation is completed, the method can leverage the existing functionality.

(4) Using the same STREAMLINE_FLG flag, the Generate Metrics can be automatically submitted. (5) Additionally, the Business Rule Exceptions can be configured so that they are automatically addressed removing the need for the end user to access a workbench page.

All of the above can be automated from the call of the Web service or the execution of the run control and occur in a contiguous, streamlined manner.

During the prevalidation process, edits are being performed to help control the quality of the data that is entering the system. In implementations with a request-response model, the result set (response) is generated by a system, removing most elements of error; however both the Web service and manual load methods allow for some type of manual population. As system integrators develop processes to automate the integration of the discovery application data mistakes or inconsistencies may be encountered. The prevalidation process helps verify the data is properly formatted and meets some requirements assumed by the request-response model.

For example, the request-response model knows what type of data is requested of the discovery applications. The request-response model may request discovery information for a given set of hardware, laptops and desktops, but not servers, or the system may request information about a single software title, Microsoft Projects. Because the system in the request-response model is programmed to understand the request and query the system it is expected that only that data is sent back. For both of these methods there is less certainty that the information that enters the prestaging tables is understood by the asset management system because it was not requested.

If we take the example used above, if a server were to be included in the Web service XML or input to the prestaging tables, it is likely that the asset management system would not be setup to consume server machines. It is also possible that if the system integrator populates the XML or prestaging table with Adobe Photoshop, that it may not be setup on the asset management system. Additionally (and only for option 2), when the tables are manually populated, there is an edit to ensure that there is a header record (hardware) for the detail records (software). Hardware is a parent record to the software record since software is installed on the hardware. These errors can be trapped in the prestaging process and moved to an error table. This helps the system integrators identify problems with the data that is entering the asset management system where the root of the problem exists. Without this additional error handling, future processes may break or produce inaccurate results.

The run control also provides numerous options for reprocessing errors once they have been corrected (for both methods). For example, all of the errors could be corrected by including them in subsequent runs or for specific batch IDs.

The techniques remove the need for a request-response integration model and its reliance on the third-party discovery vendor building an XML connector to receive and process the request. Additionally, the Web service design leverages open interface tables that could be manually populated (removing the need for any XML Web service). This open integration is beneficial to customers that are more comfortable with the traditional legacy type integrations that utilize open interface tables and do not have XML expertise in-house.

Additional error handling helps maintain data integrity and reprocessing of data that is found to have errors. The techniques ease the integration from the perspective of a system integrator.

In an implementation, a method includes: in an asset management system, receiving at a Web service an inbound message to populate a prestaging table; executing the Web service to load from a discovery database a first asset entry in a first format; executing the Web service to translate the first asset entry from the first format to a second format; and executing the Web service to store the first asset entry in the second format in the prestaging table.

In various implementations, the inbound message has a parent element including hardware. The method includes performing data validation on the prestaging table including the first asset entry in the second format. The method includes performing data transformation on the prestaging table including the first asset entry in the second format.

The method includes performing error validation on entries of the prestaging table including the first asset entry in the second format; for an entry of the prestaging table determined to comprise an error, storing the entry in an error table; and for an entry of the prestaging table determined not to comprise an error, storing the entry in a staging table.

The method includes displaying to a user entries in the error table; permitting the user to make edits to correct entries in the error table; and submitting the error table with the corrected entries to the Web service. The method includes executing the Web service on the error table with the corrected entries; and storing the corrected entries in the staging table.

The method includes in the asset management system, permitting interfacing of a custom program between the discovery database and the prestaging tables; executing the custom program to load from the discovery database a second asset entry in the first format; executing the custom program to translate the second asset entry from the first format to the second format; and executing the custom program to store the second asset entry in the second format in the prestaging table.

After executing the Web service, without user intervention, error validation is performed on entries of the prestaging table including the first asset entry in the second format. After executing the custom program, only after user intervention, error validation is performed on entries of the prestaging table including the second asset entry in the second format.

The inbound message conforms to, for example, a SOAP protocol. The Web service includes or accepts data in an XML document format. Upon request to the Web service, the Web service publishes to a requester a specification including services provided by the Web service. The discovery database is compiled through automated discovery, where devices discovered by the automated discovery are connected (e.g., physically connected) to a network, such as a local area network, Internet, Ethernet, or other.

The Web service can execute on a server machine, connected to a network, and the inboard message is communicated to the Web service over the network using an HTTP protocol. The Web service can execute on a server machine, connected to a network, and the inboard message is communicated to the Web service over the network using a SOAP protocol. The Web service executes on a server machine, connected to a network, and the inboard message is communicated to the Web service in a XML format.

In an implementation, an asset management system including: a prestaging data table, residing on a disk of the system, to store first information in a first format; a Web service interface to the prestaging data table, executing on a server of the system, to accept second information in a second format, different from the first format, where upon a request from a requestor to the Web service over a network connection, the Web service makes available the second format to the requestor over the network connection, upon receiving second information in the second format, creating first row-sets compatible with the first format, the row-sets comprising the second information; and storing the row-sets in the prestaging data table; and a user-custom program interface to the prestaging data table, through which the prestaging data table will accept and store third information, initially provided to the user-custom program interface in a third format different from the first format and subsequently converted into second row-sets compatible with the first format. In an implementation, the Web service does not make available the first format to the requestor.

In various implementations, the second information includes information technology assets gathered by automated network discovery, each of the information technology assets being physically connected to a data network. The second format may be the same as the third format. The prestaging data table is a first prestaging data table including hardware information technology assets and the system includes: a second prestaging data table, including software information technology assets, where the second prestaging data table resides on the disk of the system.

The system includes: a run control page interface, where upon storing of two or more of the first row-sets in the prestaging data table, via the run control page interface, an error checking process is initiated on the first row-sets without user intervention, and upon storing of a two or more of the second row-sets in the prestaging data table, the error checking process is not initiated on the second row-sets until initiated by a user.

In an implementation, the second format is an XML format. The third format is not an XML format. The run control page interface is accessible by the user from a terminal, remote from a machine comprising the disk where the prestaging data table resides, and a first graphical user interface screen provided by run control page interface includes: a run button through which the user can select to indicate starting of the error checking process; a text box through which the user can input a batch identifier representative of the second row-set; and a streamline batch process option which when not selected, upon detecting errors during the error check process, allowing the user to correct each error, and when selected, upon detecting errors during the error check process, automatically correcting at least one of the errors without user intervention.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 9 shows a sample computer screen allowing a user to set up software titles.

FIG. 10 shows a sample computer screen allowing a user to set up information technology resources (computer hardware types).

FIG. 11 shows the delivered query/report for the preload integration errors.

DETAILED DESCRIPTION OF THE INVENTION

Figure 1:
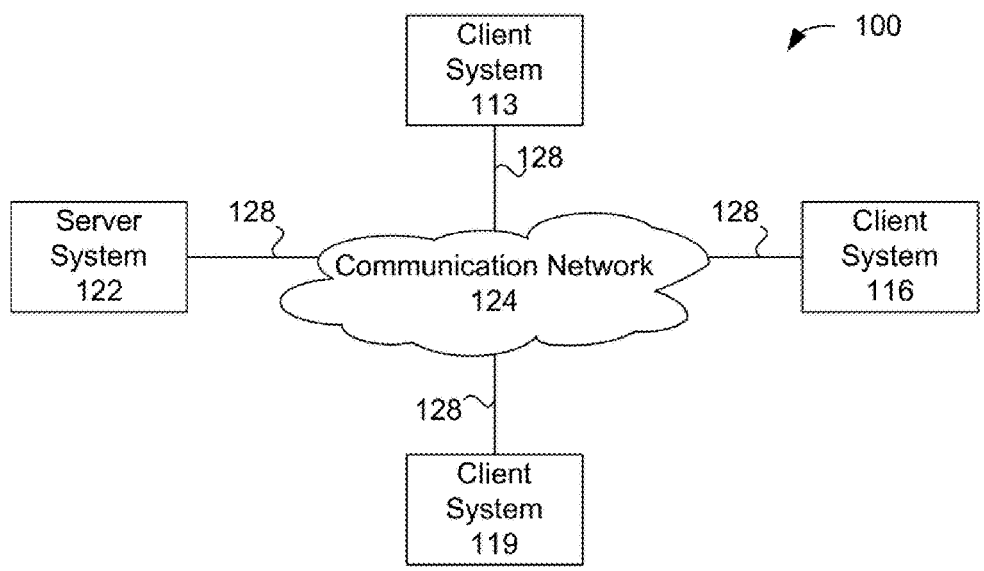
FIG. 1 shows a block diagram of a client-server system and network in which an embodiment of the invention may be implemented.

FIG. 1 is a simplified block diagram of a distributed computer network 100 which may include an implementation of the present invention. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "Web browser" application executing on a client system enables users to select, access, retrieve, or query information stored by server system 122. Examples of Web browsers include the Internet Explorer browser program provided by Microsoft Corporation, and the Firefox browser provided by Mozilla Foundation, and others.

Figure 2:
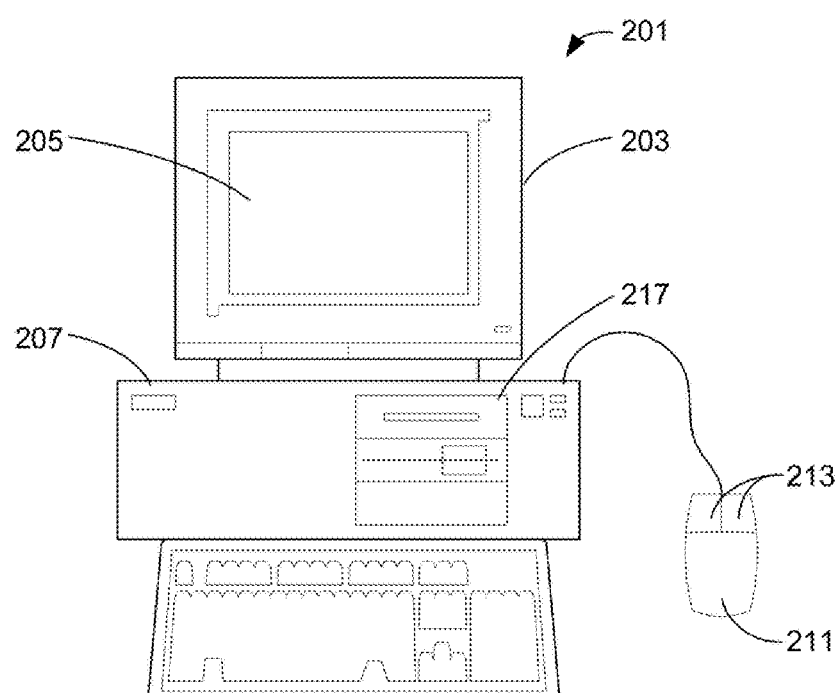
FIG. 2 shows a more detailed diagram of an exemplary client or computer which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented, computer-executable version, or computer program product of the invention may be embodied using, stored on, or associated with computer-readable medium. A computer-readable medium may include any non-transitory medium that participates in providing instructions to one or more processors for execution. One or more non-transitory computer-readable media may take many forms including, but not limited to, nonvolatile, and volatile media. Nonvolatile media includes, for example, flash memory, or optical or magnetic disks. Volatile media includes static or dynamic memory, such as cache memory or RAM.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
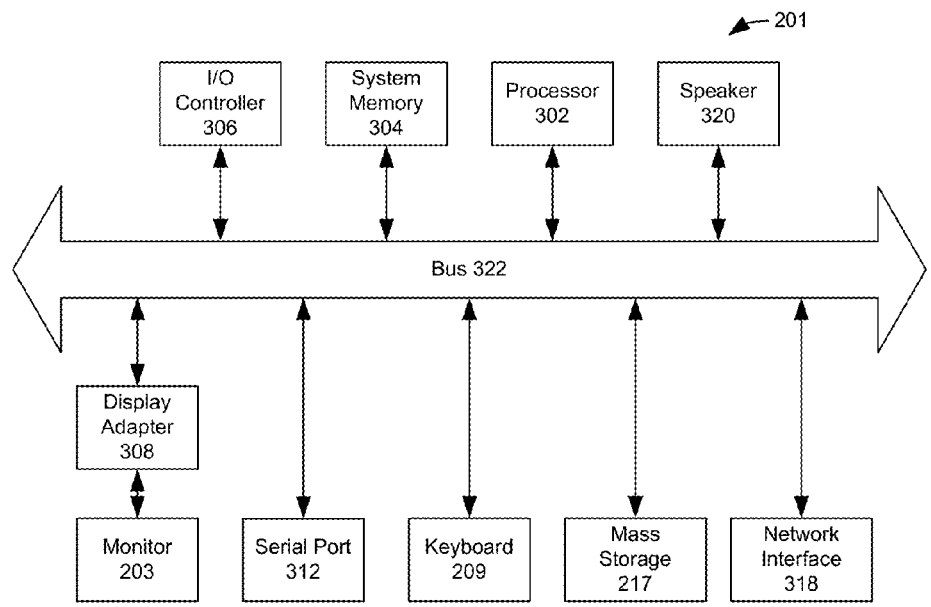
FIG. 3 shows a system block diagram of a client computer system used to provide a user interface according to the invention.

FIG. 3 shows a system block diagram of computer system 201 which may be used to execute software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
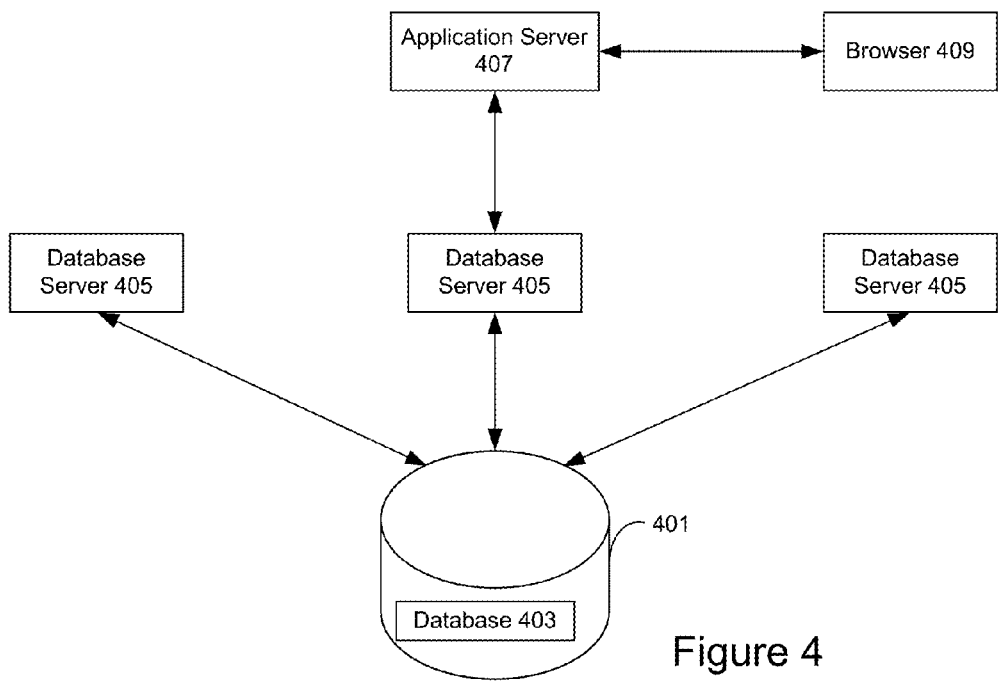
FIG. 4 shows data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a Web browser 409 is utilized to access the application server.

Figure 5:
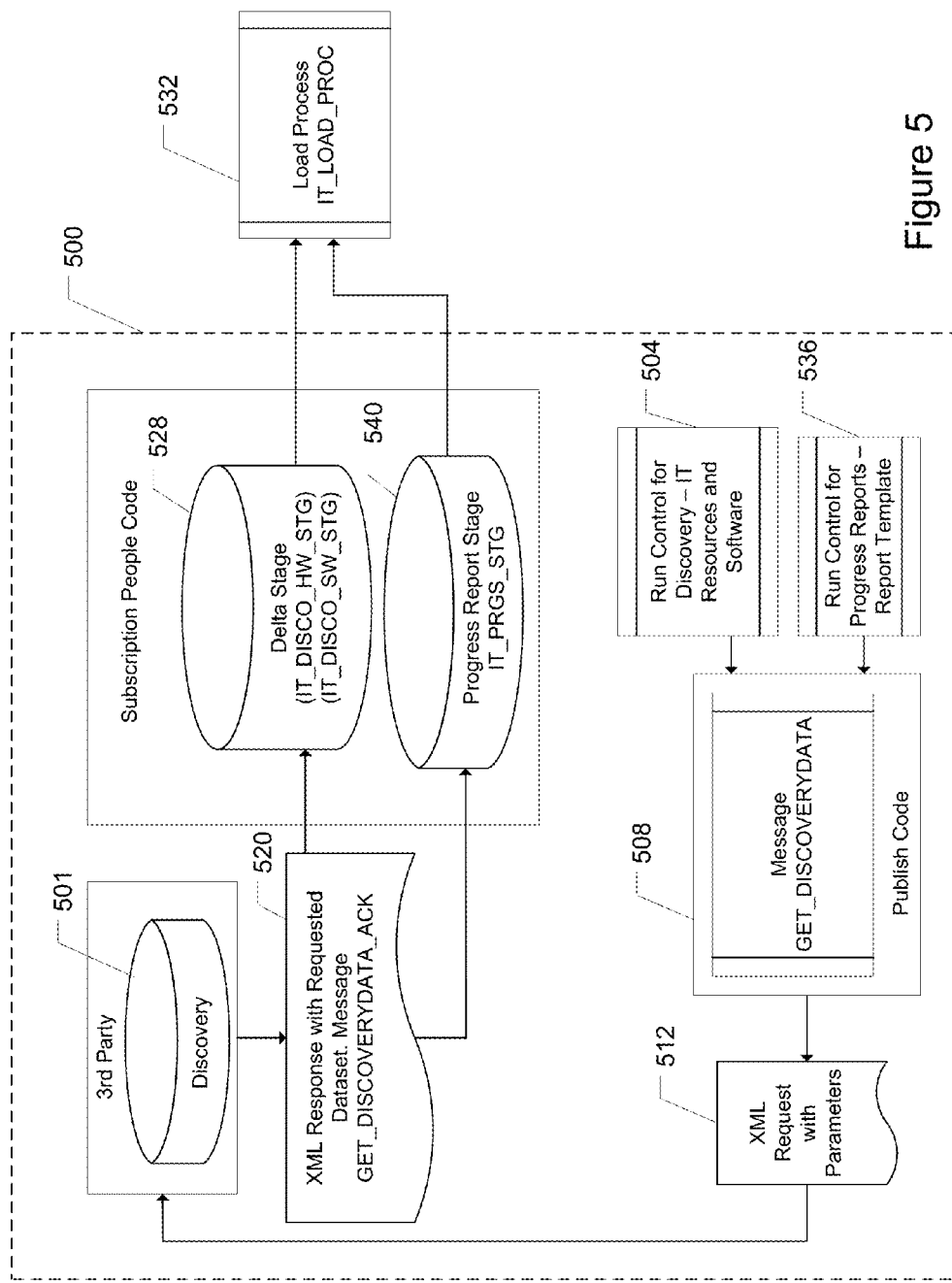
FIG. 5 shows a specific implementation of an asset management system using a request-response model to receive asset data.
Figure 6:
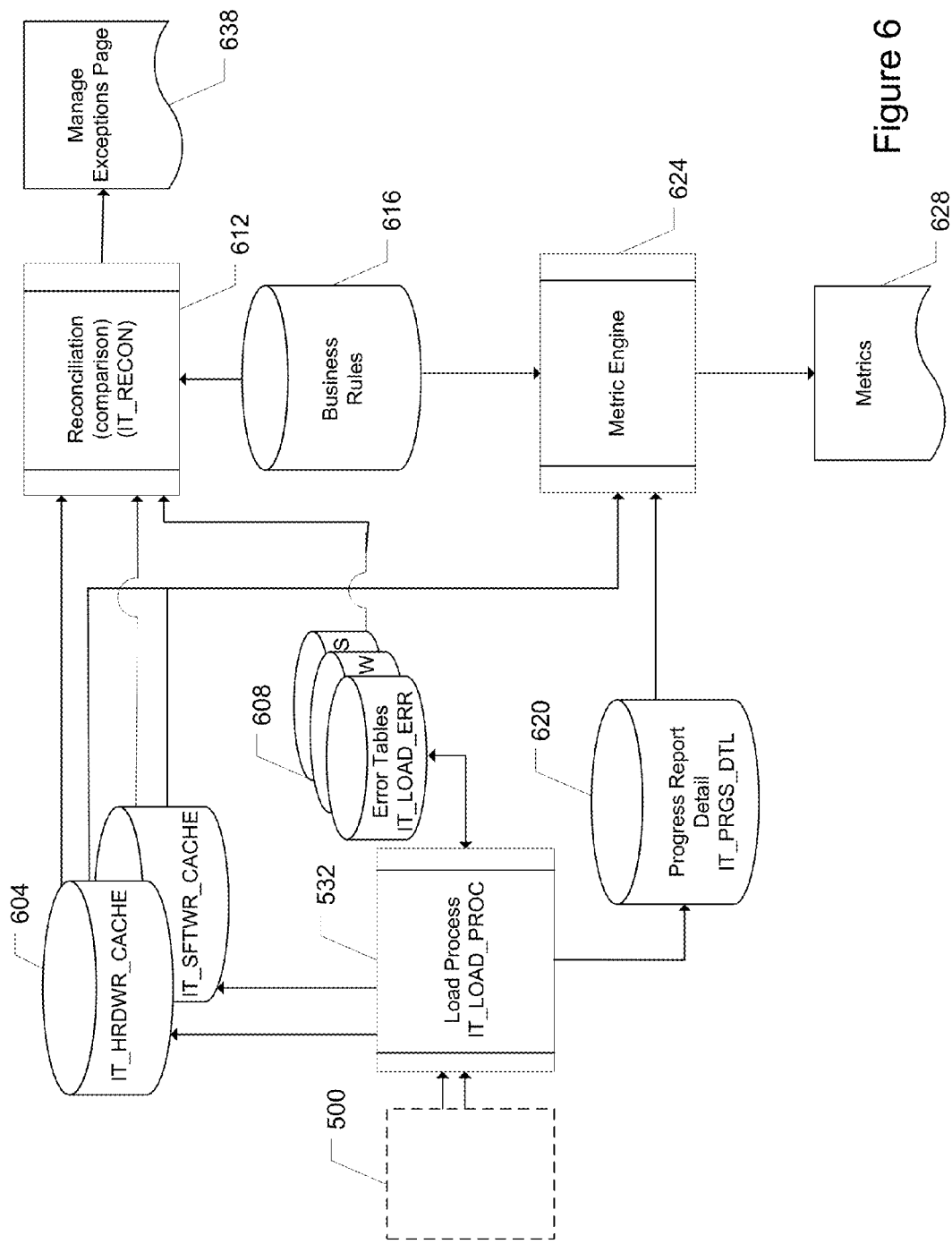
FIG. 6 shows a specific implementation of an asset management system where asset data discovered using asset discovery software is loaded into a data repository.

FIGS. 5 and 6 show an asset management system. The asset management system records and tracks the assets of a company. The system can also perform financial analysis, evaluate, reconcile, and carry out other processing on the asset data. The asset data of a company can include information technology (IT) type assets such as software, application programs, servers, computers, monitors, printers, hard disks, printers, network switches, routers, telephones, personal digital assistants, and smartphones. Other kinds of assets may also be handled by the system.

This system can be implemented using clients, servers, networking, software, application programs, and databases such as those described above. A specific implementation of an asset management system is the IT Asset Management (ITAM) system from Oracle Corporation.

Asset data may be provided to the system from a variety of sources:

1. Asset data can be directly entered (e.g., keyed in by a user) into the system.

2. Asset data can be loaded in from a file or listing of newly acquired assets. For example, when purchasing new computers, the computer vendor may give the user a file with the asset information on all the new computers. The data in this file can be loaded in the asset management system.

3. Asset data can be discovered via software searching a network and identifying each device connected to the network. The discovered asset data can then be loaded in the system.

FIG. 5 shows a specific implementation of an asset management system using a request-response model. Asset data for the system can be discovered using asset discovery software, such as from a third party. The discovery software searches through a network to find assets (e.g., computers, printers, copiers, and other equipment), and stores the discovered asset data into a discovery database 501. Therefore, for automatic discovery, the assets are connected via a network such as an local area network (LAN), wide area network (e.g., WAN or Internet), or Ethernet (10/100 megabits per second or gigabit)), through which information about the particular assets can be determined.

A user can store and integrate this discovered asset data into applications by sending this asset data to an asset management system. Doing so allows the user to record and track assets found during a discovery process to better manage inventory. The discovered asset data may also be referred to as dynamic asset information. The discovery data may be updated periodically.

In FIG. 5, the asset management system facilitates an asset information gathering process by employing a request-response model. The asset management system sends a request to a discovery system for particular assets stored in discovery database 501. The discovery system receives and parses through the terms in the request to determine the requested assets, searches and queries the discovery database based on the requested assets, and retrieves the asset data from discovery database 501. The discovery system generates and sends a response containing the requested assets along with other pertinent asset information to the asset management system. The asset management system receives the response and loads the discovered asset data into a data repository such as a staging table. The system can further process the discovered data stored in the staging tables for data validation and errors through a load process.

In a specific implementation, the asset management system uses an XML structure when employing the request-response model to integrate the inventory data. The asset management system sends an XML request to retrieve information from a database by executing a run control for discovery 504. A run control is a saved configuration detail that allows the asset management system to run a process or report. Run controls are set up the first time a report or process is run, and subsequently do not need to be created again; they can be reused each time the system runs a report. The run control includes parameters (search criteria), which are the assets requested by the asset management system. Parameters can be any IT resources such as servers, laptops, desktops, software (i.e., Adobe Acrobat) or any IT devices of that type.

In a specific implementation, run control for discovery 504 has a corresponding run control identifier which can be entered to execute run control for discovery 504. In a specific implementation, run control for discovery 504 can be utilized for many requests by changing the parameters each time the asset management system sends a request. In another specific implementation, the asset management system has a separate run control for each set of particular assets.

Run control for discovery 504 initiates and publishes a message 508 to the discovery system. The message creates a request with parameters 512 according to the details in the run control and the asset management system sends the request with parameters to the discovery system. The request provides the parameters for the data to the discovery system.

The discovery system receives the request from the asset management system, parses through the parameters in the request to determine the asset information requested, and searches discovery database 501 based on the requested assets. The discovery system retrieves the requested information from the discovery database and generates a response 520 containing the assets matching the parameters in the request (i.e., discovery data) along with any other information requested. The discovery system sends the response to the asset management system.

The asset management system receives the response with the discovery data and loads the discovery data into staging tables 528 (i.e., IT_DISCO_HW_STG and IT_DISCO_SW_STG). The staging tables hold discovery data and contain information on assets found by the software along with corresponding asset information. The asset information gathering process is completed once the data is in the staging tables.

The data stored in the staging tables is submitted to a load process 532 to perform data validation, data translation, and mapping edits. In a specific implementation, when the asset management system receives the response, load process 532 is submitted automatically to take the data in the staging tables as input. More details of load process 532 are below.

As discussed, the discovery database contains physical asset information compiled through a physical or automatic discovery technique. The asset information (e.g., physical attributes or attribute values of an IT asset) may include information such as serial number, manufacturer, model, primary user, location, machine type, network address of machine, machine name, user configured physical attributes or attribute values, and software installation and usage, or any asset information of that type.

For example, if the asset management system sends a request for Adobe Acrobat software to the discovery system, the discovery system will search the discovery database with Adobe Acrobat as the search criteria and generate a response. The response may include specific computers running Adobe Acrobat, their licensing arrangements, and the version of Adobe Acrobat running on the computer. The discovery system will send this response to the asset management system to load into the staging tables.

In one embodiment, the software assets are stored in one staging table and the hardware assets are stored in a different staging table. In another embodiment, the software assets and hardware assets are stored in the same staging table with a flag to distinguish software assets from hardware assets.

In a specific embodiment, the asset management system executes a run control for progress reports 536. Run control for progress reports 536 generates progress reports about the status of the request and response. The progress report can include information such as the asset data requested, the response to the request along with asset information, the time the request and response were sent, the number of assets found for a given category of assets, and any other pertinent information. The progress report is stored in a repository such as a progress report stage table 540 and is accessible by the user.

FIG. 6 shows a specific implementation of an asset management system where asset data discovered using asset discovery software is loaded into a data repository such as application tables or cache tables. Once the discovered data is stored in the data repository, the asset management system can use the data as input into other applications.

In a specific implementation, the asset management system performs data validation and error checking on data stored in the staging tables before loading the data into the application tables. As shown in FIG. 6, the asset management system uses load process 532 to perform this function. Load process 532, for example, checks that the assets in the response match the assets in the request. Discovered assets that pass the edits (i.e., data has been validated and has no errors) in the load process are written to cache tables or application tables 604 (IT_HRDWR_CACHE and IT_SFTWR_CACHE). Any discovered assets from the staging tables that do not pass the edits in the load process are put into error tables 608 to be reprocessed later.

In one embodiment, software assets are stored in one application table and hardware assets are stored in a different application table. In another embodiment, the software assets and hardware assets are stored in the same application table with a flag to distinguish software assets from hardware assets.

Data stored in the application tables can be used as input to other applications and processes. In a specific implementation, for example, the asset management system compares discovery data in the application tables to assets in a second repository via a reconciliation process 612. The second repository can be a set of static asset information input separately, perhaps as part of a financial system. The reconciliation process identifies discrepancies or exceptions between the discovered and static sets of asset information.

The exceptions may be determined based on one or more business rules 616. These business rules provide the logic (e.g., through Boolean comparisons) to determine whether an exception has occurred. If the reconciliation process finds discrepancies or exceptions, a manage exceptions page 638 allows a user to act upon them. A metrics engine 624 uses the information provided by the discovery system, reconciliation process, and asset repository to calculate user facing metrics 628 or portals. These metrics 628 or portals summarize the current state of the asset management system based on criteria specific to each user. In a specific implementation, metrics 628 produces a portal that shows the totals for a user's role access of the number of exceptions by business rules 616. Another metrics 628 can show assets that are no longer reporting to the discovery system. In yet another example, snapshots of software compliance are generated indicating how many software titles are not currently compliant.

In one embodiment, a progress report is created based on the outcome of the data validation and error checking of load process 532. The progress report is stored in a progress report detail table 620 and is accessible by a user. The progress report can contain information such as the assets loaded into the application tables along with corresponding asset information.

Figure 7:
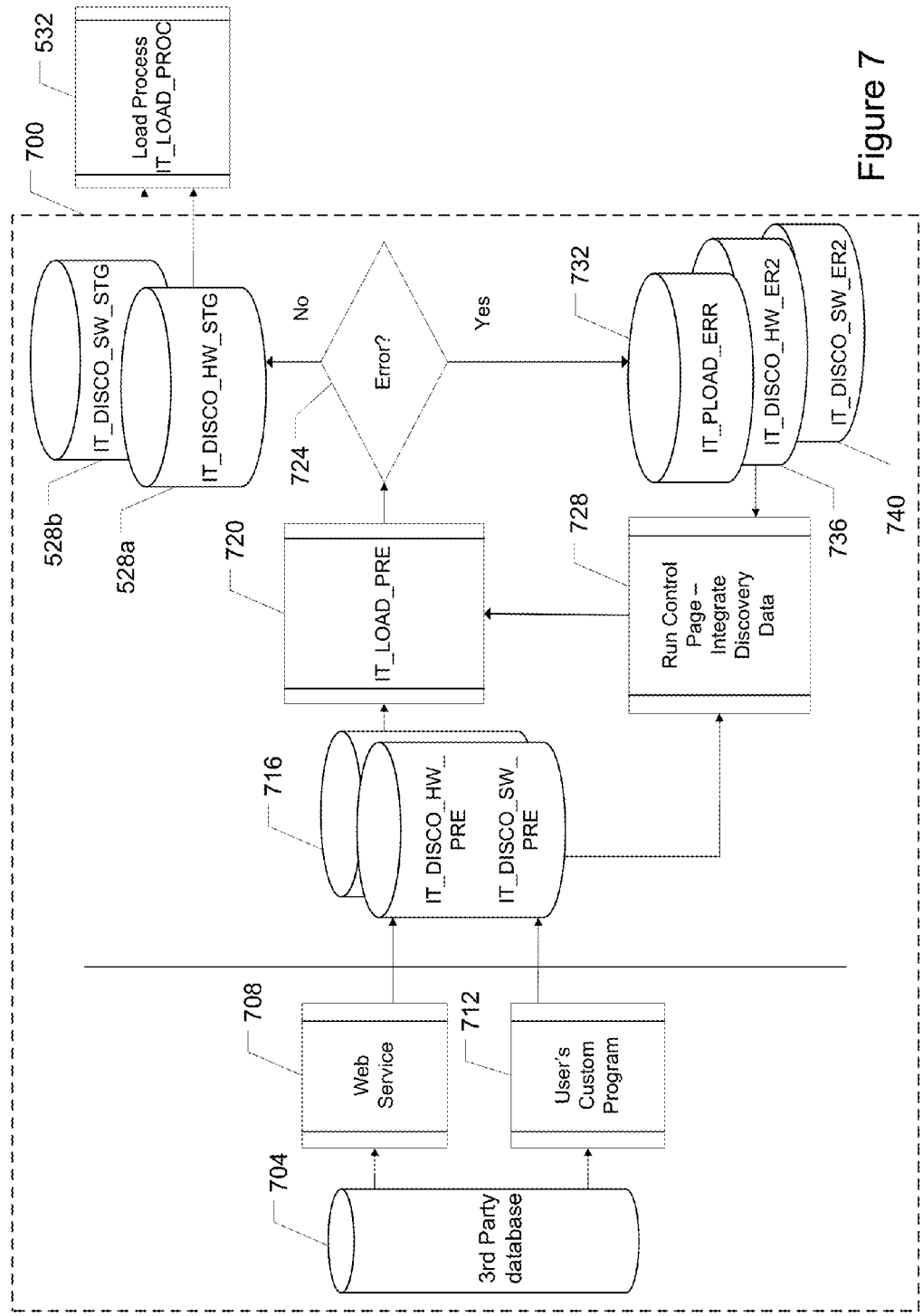
FIG. 7 shows a specific implementation of an asset management system using a Web service or user's custom program (or other technique of manual load), or both to receive asset data.

FIG. 7 shows a specific implementation of an asset management system using a Web service or user's custom program (or other technique of manual load), or both. As was the case for the request-response model in FIG. 5, asset data for the system can be discovered using asset discovery software, such as from a third party.

The Web service or user's custom program approaches may be combined in any combination with the request-response model discussed above and shown in FIG. 5. For example, an asset management system allows access via (1) request-response, Web service, and user's custom program; (2) request-response and Web service only; (3) request-response and user's custom program only; (4) Web service and user's custom program only; (5) Web service only; or (5) user's custom program only. Additionally, the asset management system may allow access through other techniques not discussed in this application.

A process 700 is an asset information gathering process to integrate inventory data from third party discovery applications into an asset management system. For purposes of this application, process 700 includes a Web service 708 and user's custom program 712. Process 700 does not include a technique for access through the request-response model of FIG. 5. Process 700 can be used in place of process 500 in FIG. 6. However, in other implementations, process 700 can be used in combination with process 500 in FIG. 5. Also, process 700 may include only Web service 708 or only user's custom program 712, or include additional loading or access techniques.

For process 700, two options or techniques are provided for users to integrate their inventory data into the asset management system: (1) Web service or (2) manual load, or any combination of these. Using these techniques, the asset management system uses interface tables or prestaging tables as an integration point to process and integrate data from discovery applications. The asset management system loads discovered asset data into the prestaging tables, which are used to store discovery data before loading the data into staging tables. These techniques leverage the prestaging tables for hardware and software asset attributes by allowing a user to manually populate the prestaging tables directly.

Table A below shows a sample of a hardware prestaging record with sample field values for an embodiment of the invention.

TABLE A

| Fields-IT_DISCO_HW_PRE | Manual Option | Sample Values |
|---|---|---|
| TASK_ID | User-defined | PRESTAGE TABLES |
| RUN_CNTL_ID | User-defined | Test Run |
| BATCH_ID | User-defined | MAY INVENTORY 2007 |
| SERIAL_ID | Unique Value | 5TY2J11 |
| PARENT_SERIAL | Not used | |
| MFG_ID_DISCO | Manufacturer-see code mappings | Hewlett-Packard |
| IT_RESOURCE | IT asset type in Discovery application -s ee IT Subtypes | Desktop |
| MODEL_DISCO | Model | D330 |
| PRIMARY_USER | Primary user of the IT asset- see Employee Network IDs | Njohnson |
| USER_DOMAIN | Primary user's domain - see Employee Network IDs | Corp |
| IP_ADDRESS_DISCO | Address and IP locations | 172.17.32.19 |
| DISCOVERY_DATE | Date the IT asset was last inventoried | Mar. 16, 2007 |
| IT_UD_CHAR1 | User-defined | |
| IT_UD_CHAR2 | User-defined | |
| IT_UD_DATE1 | User-defined | |
| SOURCE_ID | User-defined | SF DISCOVERY |

Table B provides a sample of a software prestaging record with sample field values for an embodiment of the invention.

TABLE B

| Fields-IT_DISCO_SW_PRE | Manual Option | Sample Values |
|---|---|---|
| TASK_ID | User-defined | PRESTAGE TABLES |
| RUN CNTL_ID | User-defined | Test Run |
| BATCH_ID | User-defined | MAY INVENTORY 2007 |
| SERIAL_ID | Unique Value | 5TY2J11 |
| KNOWN_AS | Software title in the discovery application | Norton AntiVirus |
| DISCOVERY_DATE | Date the IT asset was last inventoried | Mar. 16, 2007 |
| SFTWR_INSTALL_DT | Not used | |
| TOTAL_RUN_TIME | Measure of how long the application software was in use | 112548 |
| SOURCE_ID | User-defined | SF DISCOVERY |

After data in the prestaging process has been validated, the validated data is loaded into staging tables. The staging tables can be used for record keeping.

In a specific implementation, the prestaging table has a few more key fields to identify it than the staging table. For example, these key fields can be TASK_ID and BATCH_ID fields. TASK_ID identifies it as either the Web service integration or the manual load of the prestaging tables. After IT_LOAD_PRE process 720 performs the error checking routine, the discovery data is moved from the prestaging tables to the staging tables based on those two key fields. Those two key field values will be specified in the XML Web service or, if using the manual load of the prestaging tables option, it will be specified on the run control page. On the run control, the user can also process more than one BATCH_ID. So the user can use the Web service to load data from two different discovery data sources. For example, the user can discover data from their Boston location and San Francisco location. So the data from these two locations will sit in the prestaging tables (if a streamline batch process option is not turned on) until submitted via the run control.

Data in the staging tables can be accessed by the asset management system as well as by third parties such as customers of the system. The asset information gathering process is completed once the data is in the staging tables. The process of loading the data into the application tables proceeds in the same manner as it did in the request-response model (see FIG. 6) and the asset management system can use the data in the staging tables as input to load process 532.

In one embodiment, the software assets are stored in one prestaging table and the hardware assets are stored in a separate prestaging table. In another embodiment, the software assets and hardware assets are stored in the same prestaging table with a flag to distinguish software assets from hardware assets.

In a specific implementation, the Web service and manual load utilize different paths to load data into the prestaging tables and check for errors. The distinctive process of loading the data into the prestaging tables used by the Web service and manual load will be discussed in more detail below. Once the discovery data is loaded into the prestaging tables, however, the Web service and manual load continue on the same path and the asset management system loads the data from the prestaging tables into the staging tables. Once in the staging tables, load process 532 then executes to perform error checking before moving data from the staging tables to the application tables.

In a specific implementation, the user uses the request-response model to generate progress reports and leverages the Web service or user's custom program, or both to integrate data into the asset management system. Progress reports are principally driven by requesting assets that match a certain critieria. The Web service and user's customer program load the data without querying the third party discovery.

The Web service and custom program provide efficiency for users implementing the asset management system. A request no longer needs to be sent to and understood by a third party as was required in process 500. Instead, the third party can send asset data (without a request from the asset system) for the asset management system to process. Allowing the third party to manually populate the prestaging tables removes the need for the asset management system to send a request and wait for a response, decreasing data traffic and congestion. This is also more efficient because the third party can save time by sending information when the user desires without waiting for a request from the asset management system.

Further, the Web service and custom program lower the cost of ownership of an asset management system and ease discovery data integration. For example, these techniques provide flexibility for a user currently relying on a third party's connector. In the request-response model, the user was required to build a connector to receive the request from and send the response to the asset management system. Using the request-response model, if the user wishes to use a discovery application and does not have a prebuilt connector, a systems integrator would typically be tasked with building a custom integration for the user's system to understand the request and send out the response. A systems integrator would need to understand the request-response model and then either have access to the discovery application or work with them to consume the request-response model, or design a new integration method. These techniques no longer require the user to build out a connector to consume the request and produce the response, saving time and resources. This invention covers a method of integration with exposed end-points that bypass the request-response model to alleviate a majority of the work done by systems integrators.

A. Web Service

A third party can send asset data from a third-party database 704 over a network via a Web service 708 to an asset management system. The discovery data loaded from database 704 is transformed before storing the discovery data in the prestaging tables.

In a specific implementation, the discovery data is transformed into the structure defined in the XML for the Web service. In so doing, the transformation happens outside of the Web service. The Web service takes the data in a known format (e.g., XML) in a known structure and creates row-sets of the data from the message. The row-set has the same structure as the prestaging tables and is saved directly from the row-set into the prestaging tables. This process is similar to a manual load mapping (see below for details), in that the data that is in the request to the Web service should already be in the expected format.

Once the data is published using the Web service, the discovered inventory data will be integrated and stored in prestaging tables. The asset management system validates the data composition in a prevalidation process before moving the data from the prestaging tables to staging tables as input for other processes. If the prevalidation process discovers errors, they are stored in error tables to be reprocessed later.

In a specific implementation, the Web service uses an asynchronous inbound XML message to populate prestaging tables 716 (i.e., IT_DISCO_HW_PRE and IT_DISCO_SW_PRE) for hardware and software discovery data. The asset management system processes the asset data by submitting an IT_LOAD_PRE Application Engine process 720, which processes and validates the asset data in the prestaging tables, and checks for errors in a step 724.

In a specific implementation, the Web service populates the prestaging tables and submits IT_LOAD_PRE 720 automatically. In this case, the third party does not need to submit IT_LOAD_PRE 720 separately.

If the IT_LOAD_PRE process discovers errors, they are stored in error tables IT_PLOAD_ERR 732, IT_DISCO_HW_ER2 736, and IT_DISCO_SW_ER2 740. Reprocessing of prestaging Web service errors is submitted from a run control page 728. IT_LOAD_PRE process 720, error tables 732, 736, and 740, and run control 728 will be discussed in more detail below.

If there are no errors, the data will be moved into staging tables 528a (IT_DISCO_HW_STG) and 528b (IT_DISCO_SW_STG). Once the asset data is in the staging tables, the asset information gathering process is completed. At this point, the asset management system can load the asset data from the staging tables into load process 532.

Some advantages of utilizing a Web service to integrate discovery data into the asset management system include easy exchange of data between different applications and different platforms, and lower software development costs and operational costs. Web services are platform-independent and language-independent and provide a means of interoperating between different software applications running on a variety of platforms or frameworks.

Web services allow for loosely-coupled and flexible systems. For example, Web services reduce coupling between the third party and the asset management system, which can lower costs for the third party. The third party can send data via a Web service without intimate knowledge of the components and IT of the asset management system. Also, utilizing Web services does not require a tightly coupled XML connector or dependence upon a preexisting partnership with a particular discovery vendor to populate the prestaging tables.

Further, Web services can be published, located, and invoked across the Web and accessed through peer-to-peer arrangements or through central servers. As such, users can access applications and send data from remote locations. Furthermore, Web services can be wrapped around existing legacy systems to make them network-enabled. As such, users can integrate their legacy systems with little or no change to the legacy code base.

The following table C provides a sample of an XML document for the Web Service option in an embodiment of the invention.

TABLE C

```
<?xml version="1.0"?>
<PROCESS_DISCOVERYDATA>
<MsgData>
<Transaction>
  <IT_DISCO_HW_WK2 class="R">
    <RUN_CNTL_ID>WebService</RUN_CNTL_ID>
    <BATCH_ID>WS-TEST</BATCH_ID>
    <FILE_CNT>1</FILE_CNT>
    <STREAMLINE_FLG>N</STREAMLINE_FLG>
    <SERIAL_ID>SN12345</SERIAL_ID>
    <PARENT_SERIAL/>
    <MFG_ID_DISCO>Compaq</MFG_ID_DISCO>
    <IT_RESOURCE>Desktop</IT_RESOURCE>
    <MODEL_DISCO>Evo D510 SFF</MODEL_DISCO>
    <PRIMARY_USER>khennebry</PRIMARY_USER>
```

TABLE C-continued

```
    <USER_DOMAIN>Corp</USER_DOMAIN>
    <MACHINENAME_DISCO>KHENNEBRY01</MACHINENAME_DISCO>
    <IP_ADDRESS_DISCO>172.16.18.105</IP_ADDRESS_DISCO>
    <DISCOVERY_DATE>2005-03-16 18:17:49</DISCOVERY_DATE>
    <IT_UD_CHAR1>Microsoft Windows 2000</IT_UD_CHAR1>
    <IT_UD_CHAR2>5.0</IT_UD_CHAR2>
    <IT_UD_DATE1/>
    <SOURCE_ID>NY-DISCOVERY</SOURCE_ID>
    <IT_DISCO_SW_WK2 class="R">
    <RUN_CNTL_ID>WebService</RUN_CNTL_ID>
    <BATCH_ID>WS-TEST</BATCH_ID>
    <SERIAL_ID>SN12345</SERIAL_ID>
    <KNOWN_AS>Acrobat Distiller for Windows</KNOWN_AS>
    <SFTWR_VERSION>5.0.000</SFTWR_VERSION>
    <DISCOVERY_DATE>
    <SFTWR_INSTALL_DT/>
    <TOTAL_RUN_TIME>523438</TOTAL_RUN_TIME>
    <SOURCE_ID>NY-DISCOVERY</SOURCE_ID>
    </IT_DISCO_SW_WK2>
    <IT_DISCO_SW_WK2 class="R">
    <RUN_CNTL_ID>WebService</RUN_CNTL_ID>
    <BATCH_ID>WS-TEST</BATCH_ID>
    <SERIAL_ID>SN12345</SERIAL_ID>
    <KNOWN_AS>MICROSOFT_OFFICE</KNOWN_AS>
    <SFTWR_VERSION>10.0.2609</SFTWR_VERSION>
    <DISCOVERY_DATE>
    <SFTWR_INSTALL_DT/>
    <TOTAL_RUN_TIME>113295</TOTAL_RUN_TIME>
    <SOURCE_ID>NY-DISCOVERY</SOURCE_ID>
    </IT_DISCO_SW_WK2>
</IT_DISCO_HW_WK2>
</Transaction>
<Transaction>
<IT_DISCO_HW_WK2 class="R">
    <RUN_CNTL_ID>WebService</RUN_CNTL_ID>
    <BATCH_ID>WS-TEST</BATCH_ID>
    <FILE_CNT>1</FILE_CNT>
    <STREAMLINE_FLG>N</STREAMLINE_FLG>
    <SERIAL_ID>SN54321</SERIAL_ID>
    <PARENT_SERIAL/>
    <MFG_ID_DISCO>Hewlett-Packard</MFG_ID_DISCO>
    <IT_RESOURCE>Low Profile Desktop</IT_RESOURCE>
    <MODEL_DISCO>HP D330</MODEL_DISCO>
    <PRIMARY_USER>jsmith</PRIMARY_USER>
    <USER_DOMAIN>Corp</USER_DOMAIN>
    <MACHINENAME_DISCO>JSMITH01</MACHINENAME_DISCO>
    <IP_ADDRESS_DISCO>173.162.118.10</IP_ADDRESS_DISCO>
    <DISCOVERY_DATE>2005-03-16 18:17:49</DISCOVERY_DATE>
    <IT_UD_CHAR1>Microsoft Windows 2000</IT_UD_CHAR1>
    <IT_UD_CHAR2>5.0</IT_UD_CHAR2>
    <IT_UD_DATE1/>
    <SOURCE_ID>NY-DISCOVERY</SOURCE_ID>
    <IT_DISCO_SW_WK2 class="R">
    <RUN_CNTL_ID>WebService</RUN_CNTL_ID>
    <BATCH_ID>WS-TEST</BATCH_ID>
    <SERIAL_ID>SN54321</SERIAL_ID>
    <KNOWN_AS>Acrobat Distiller for Windows</KNOWN_AS>
    <SFTWR_VERSION>5.0.000</SFTWR_VERSION>
    <DISCOVERY_DATE>
    <SFTWR_INSTALL_DT/>
    <TOTAL_RUN_TIME>523438</TOTAL_RUN_TIME>
    <SOURCE_ID>NY-DISCOVERY</SOURCE_ID>
    </IT_DISCO_SW_WK2>
    <IT_DISCO_SW_WK2 class="R">
    <RUN_CNTL_ID>WebService</RUN_CNTL_ID>
    <BATCH_ID>WS-TEST</BATCH_ID>
    <SERIAL_ID>SN54321</SERIAL_ID>
    <KNOWN_AS>MICROSOFT_OFFICE</KNOWN_AS>
    <SFTWR_VERSION>10.0.2609</SFTWR_VERSION>
    <DISCOVERY_DATE>
    <SFTWR_INSTALL_DT/>
    <TOTAL_RUN_TIME>113295</TOTAL_RUN_TIME>
    <SOURCE_ID>NY-DISCOVERY</SOURCE_ID>
    </IT_DISCO_SW_WK2>
```

TABLE C-continued

```
        </IT_DISCO_HW_WK2>
      </Transaction>
    </MsgData>
  </PROCESS_DISCOVERYDATA>
```

In the XML document above, a parent (Serial ID) is provided for each software record when employing the Web service. Parent records will be discussed in more detail below.

The RUN_CNTL_ID node value should be the same throughout the XML file and the BATCH_ID node value should be the same throughout the XML file. This ensures that the asset management system is processing the same run control and batch.

When employing Web service 708, the user should not introduce duplicate or invalid serial identifiers in the XML document. An example of an invalid serial identifier might be a blank value.

In a specific implementation, when using the Web service to populate the prestaging tables, IT_LOAD_PRE process 720 is launched automatically when the XML files are received successfully by the Web services manager. In a specific implementation, Integration Broker from PeopleTools is the Web service manager.

In another specific implementation, a user identifier is defined on an external node and is used to enter the run controls on run control page 728. If a Web service is received that has the same RUN_CTRL_ID, it will take precedence over the one entered on the page.

In a specific implementation, the Web service utilizes the same tables to store the run control parameters. In this implementation, the records that are entered on the page are replaced by the parameters in the Web service. The records are then deleted when the Web service is processed.

In an embodiment, Web service 708 implements an XML file-counting solution, which leverages the XML node FILE_CNT. After receiving the XML files, IT_LOAD_PRE process 720 is submitted automatically.

In another embodiment, the STREAMLINE_FLG XML node value, when populated with a "Y," also automatically submits reconciliation process 612 and metric engine 624 batch processes.

Figure 8:
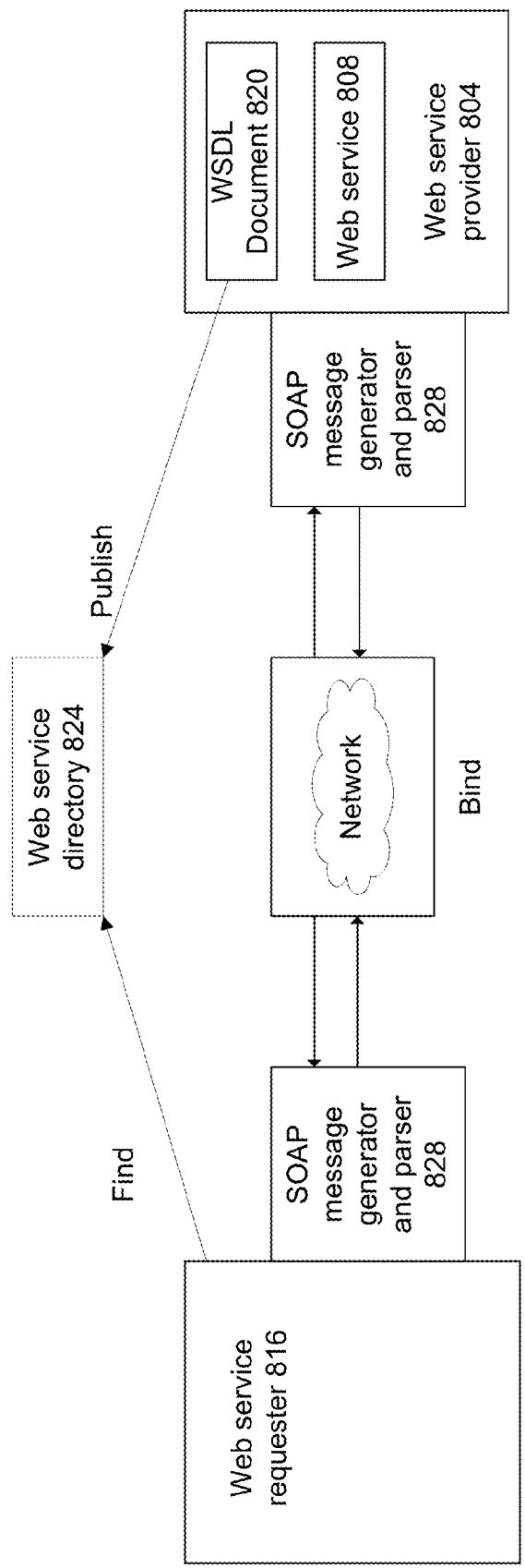
FIG. 8 shows a general process of a user interacting with a Web service.

FIG. 8 shows a general process of a user interacting with a Web service. A Web service is a software system designed to support interactions between machines over a network, such as the Internet. Web services are described in U.S. Pat. No. 7,337,148 which is incorporated by reference in its entirely along with all other references cited in the patent.

A Web service provider 804 can host a number of services, such as a Web service 808. A Web service has a particular schema associated with it that a Web services requester 816 conforms to when interacting with the Web service.

To provide Web service requesters with information on the particular schema associated with the Web service, the Web service provider creates a Web Services Description Language (WSDL) document. WSDL is a specification and provides a common way to represent data types passed in messages, operations to be performed on the messages, and mapping of the messages into network transports. A WSDL document 820 can be implemented using XML and can provide the Web service requesters with information on how to connect to the Web service, where the Web service resides, operations the Web service provides and parameters and data types of these operations.

For example, if the Web service is accessible using HTTP and FTP protocols, the WSDL contains two sections for HTTP and FTP describing the various details of how to make a connection to the Web service using the protocols.

The WSDL document is used by both parties of a Web service interaction. The Web service provider can publish the WSDL document, for example, in a Web service directory 824, such as Universal Description, Discovery, and Integration (UDDI), or by broadcasting the Uniform Resource Locators (URLs) to their WSDL via email or on their Web site.

The Web service requester finds the WSDL document, for example, in the Web service directory or from the Internet. Using the WSDL document, the Web service requester establishes a connection to the Web service provider by binding to the Web service and generates and sends a message in the appropriate format to the Web service provider.

To communicate with the Web service, the Web service requester may use a SOAP message generator and parser 828. SOAP is a specification that defines an XML grammar for both sending messages and responding to messages from other parties. SOAP allows the Web service requester to call a remote service and enables method calls and data to be sent in an XML format from one computer to another. SOAP preferably describes a message format that is independent of any hardware or software architecture or platform.

A SOAP message is an envelope containing: (1) an optional header that carries processing instructions (e.g., who must deal with the message or how to deal with the message) and (2) the body that contains the payload. The entire SOAP message (headers and body) is wrapped in this envelope. The envelope is the root element of the XML document, providing a container for control information, the addressee of a message, and the message itself. If present, a header element is the first immediate child element of a SOAP Envelope element. Header items can contain security information, credentials such as usernames and passwords, error reporting information, or anything of that type. The payload contains the data the client wants to send. Both the headers and the body are child elements of the envelope element. If a header element is present, then the Body element immediately follows the Header element; otherwise, the Body element is the first immediate child element of the Envelope element.

SOAP supports two different communication styles: (1) documents and (2) Remote Procedure Calls (RPCs). The payload of a document message is any XML document that the user wants moved from one computer to another. An RPC is a method call that is intended to be executed on the Web service's computer. SOAP enables the binding and usage of discovered Web services by defining a message path for routing messages.

A SOAP message can contain a call to a method along with any parameters that might be needed. SOAP messages can be used in combination with a variety of protocols such as HTTP (Hypertext Transfer Protocol), JMS (Java Message Service), SMTP (Simple Mail Transfer Protocol), FTP (File Transfer Protocol), or Message queues. These protocols transport requests and responses between clients and servers, carrying any information that is placed in it from one point to another.

In one embodiment, SSL (Secure Sockets Layer) is used to secure a socket and all of the data that passes through it (e.g., encrypts the entire SOAP message). For example, when a client sends a request to a server, the server sends a certificate back to the client containing the server's public key. If the server's public key is valid, a handshaking procedure takes place and the session begins. In one embodiment, SSL-based software classes such as the Java Secure Socket Extension (JSSE) are used.

In one embodiment, a client system packages asset data into a SOAP envelope and sends it to the Web service's URL using HTTP. When the Web server receives the HTTP message, it strips off the headers and passes the SOAP message with the asset data to a SOAP engine. The SOAP engine removes the header portion and processes the instructions in the header.

A client can generate its own SOAP messages, open a socket, and then send the message to a Web service listening on that socket. When the Web service receives the message, the Web service can parse the SOAP message, make its own method calls, write to its own logs, and prepare its own SOAP response message. The Web service then opens a response socket and sends the return message to the client. When the client receives the response, the client can display the results.

In one embodiment, the transaction will be retried if the transaction fails. In another embodiment, the transaction will fail gracefully and inform the client that the transaction did not complete.

B. Manual Load Process

As shown in FIG. 7, a user can directly populate the prestaging tables manually by loading (e.g., user's custom program 712) hardware and software discovery data into the prestaging tables. The user can directly load the prestaging tables, for example, through the use of a custom program. The user can create or design the custom program or use a third-party program.

After ensuring that all discovery data is loaded into the prestaging tables, the asset management system processes the data from the prestaging tables and loads the data to the staging tables. Processing the data includes validating, translating, and transforming the discovery data before loading the data into the staging tables. The asset information gathering process is completed once the data is in the staging tables.

Once loaded into the staging tables, the process of loading the data into the application tables proceeds in the same manner as it did in the request-response model (see FIG. 6). Discovery data in the staging tables can be used as input for the existing processes.

An advantage of the manual load process design is that it leverages open interface tables that can be manually populated (removing the need for any XML Web service). This open integration is beneficial to customers that are more comfortable with traditional legacy type integrations that utilize open interface tables. Also, customers can integrate a legacy system which may not support Web services into the asset management system. In addition, users who do not have XML expertise in-house have the benefit of using this option. So, customers can use a custom interface provided or created on their own to populate the discovery data themselves.

In a specific implementation, the user uses user's custom program 712 and manually submits it to directly populate prestaging tables 716. In a specific implementation, run control page 728 is designed and created by the user. Run control page 728 is used to load and process the discovered data and submits the IT_LOAD_PRE process. Additionally, run control page 728 can be used to process prestaging errors resulting from the Web service or manual load. Once IT_LOAD_PRE process 720, which processes the data, is initiated the manual load process then picks up in the same manner as Web service 708.

In a specific implementation, the user has an automated program that runs nightly to populate the tables. For example, the user can schedule run control page 728 to run at a certain time (e.g., Tuesday nights at 8 p.m., Saturdays at midnight). In this case, the run control page is submitted manually once (i.e., the first time it is set up) and subsequently is submitted automatically at a predetermined time.

In another specific implementation, the user manually selects the data out of the tables and manually loads the data into the prestaging tables.

When using the custom program, the user should fix or remove duplicate or invalid serial identifiers before loading the prestaging tables. An example of an invalid serial identifier might be a blank value.

Before launching IT_LOAD_PRE process 720, the user should make sure that user-defined fields are in agreement between the discovery database and the asset management system. For example, if a prestaging table has a field IT_UD_CHAR1 used to store memory in the Asset Repository, the value that is loaded in the prestaging tables should similarly be a value from the discovery database representing computer memory.

IT_LOAD_PRE process 720 is a prevalidation process used to check for errors in a step 724 and to validate data composition before moving the data from the prestaging stables to the staging tables as input for other processes. The entry points of the prestaging tables provide for additional data prevalidation and error handling of invalid data. The prevalidation process and error handling helps verify that the data meets some requirements assumed by the request-response model and helps ensure that the data is properly formatted to maintain data integrity When IT_LOAD_PRE process 720 is called, it can process errors from prior executions of the program. In a specific implementation, errors from IT_LOAD_PRE process 720 are recorded in error table IT_PLOAD_ERR 732 with a corresponding error code and the prestaging table data for the record in error is stored or inserted in error tables IT_DISCO_HW_ER2 736 and IT_DISCO_SW_ER2 740 as a clone of the prestaging table data.

In one embodiment, errors associated with hardware are stored in error table IT_DISCO_HW_ER2 736 and errors associated with software are stored in error table IT_DISCO_SW_ER2 740. In another embodiment, errors associated with software and hardware are stored in the same table with flags to distinguish them.

These errors can be trapped in the prestaging process and moved to the error tables. Error tables 732, 736, and 740 help the systems integrator identify problems with the data entering the asset management system where the root of the problem exists.

Error handling provides better data management as data entering the system from third parties can be corrected locally without having to be resubmitted. Without this additional error handling, future processes could break or produce inaccurate results. To fix errors, the user can resend the asset with the correct information or go into the error tables directly and modify the tables. Run control page 728 provides numerous options for reprocessing errors once they have been corrected.

In a specific implementation, all errors can be corrected by including them in subsequent runs or for specified batch identifiers. Error handling provides better data management as data entering the system from third parties can be corrected locally without having to be resubmitted.

During prevalidation, edits are performed to help control the quality of the data entering the system. In a specific implementation, IT_LOAD_PRE process 720 performs edits in this sequence to ensure the following:

1. No orphan software data when populating the prestaging tables manually (e.g., via a custom program). The IT_LOAD_PRE process verifies the structure of the content for manually loaded rows, specifically verifying that the software is associated with the hardware. This is done to validate the parent-child relationship for hardware and software data and to ensure there is a header record (hardware) for the detail records (software). More specifically, this ensures that all data in the software prestaging table (IT_DISCO_SW_PRE) has a corresponding parent/header hardware record in the hardware prestaging table (IT_DISCO_HW_PRE). Hardware is a parent record to the software record since software is installed on the hardware. This is consistent with the existing expectation of data that is provided to the asset management system from third party systems.

Figure 12:
FIG. 12 shows a sample computer screen where a user can enable automatic execution of streamlining the data from receiving the asset data to loading the data into the application tables.

To fix this error, a parent hardware record is needed. The parent hardware record could be inserted directly into hardware prestaging error table 736 (IT_DISCO_HW_ER2). In a specific implementation, as shown in FIG. 12, the user can use run control page 728 to specify a Batch ID, click a Process All Errors check box, and submit the IT_LOAD_PRE process batch process to reprocess the error data.

Alternatively, if resubmitting all of the data, the record can be inserted in prestaging table 716 (IT_DISCO_HW_PRE). The user can repopulate the prestaging tables with data for the Serial ID including the parent hardware record. To do this, the user can delete the data in the prestaging error tables for that Serial ID manually, for example, using SQL (Standard Query Language). Run control page 728 can then be used to specify the Batch ID of the corrected data in the prestaging tables and to submit the IT_LOAD_PRE process batch process.

This edit is not performed when using the Web service option because the structure of the XML ensures data in the software prestaging table has a corresponding header hardware record in the hardware prestaging table. More specifically, due to the structure of the XML for the Web service method, there is a parent (Serial ID) provided for each software record. The XML schema should be validated prior to posting the Web service.

For example, the user or interface could manually load the software table but forget to load the hardware table. If this were to occur in the data sent into the Web service, it would not be able to be loaded because the software cannot be saved to the table without the corresponding hardware.

2. Software Title mappings are valid. A user can send data that has not been entered yet into the asset management system. To fix this error, the user can go into the asset management system and ensure that the applicable software title is mapped appropriately in the asset management system. More specifically, the user should ensure that the KNOWN_AS value in the XML is mapped on the asset management Code Mappings page. The user can add the mapping and then use run control page 728 to reprocess the errors.

Figure 9:
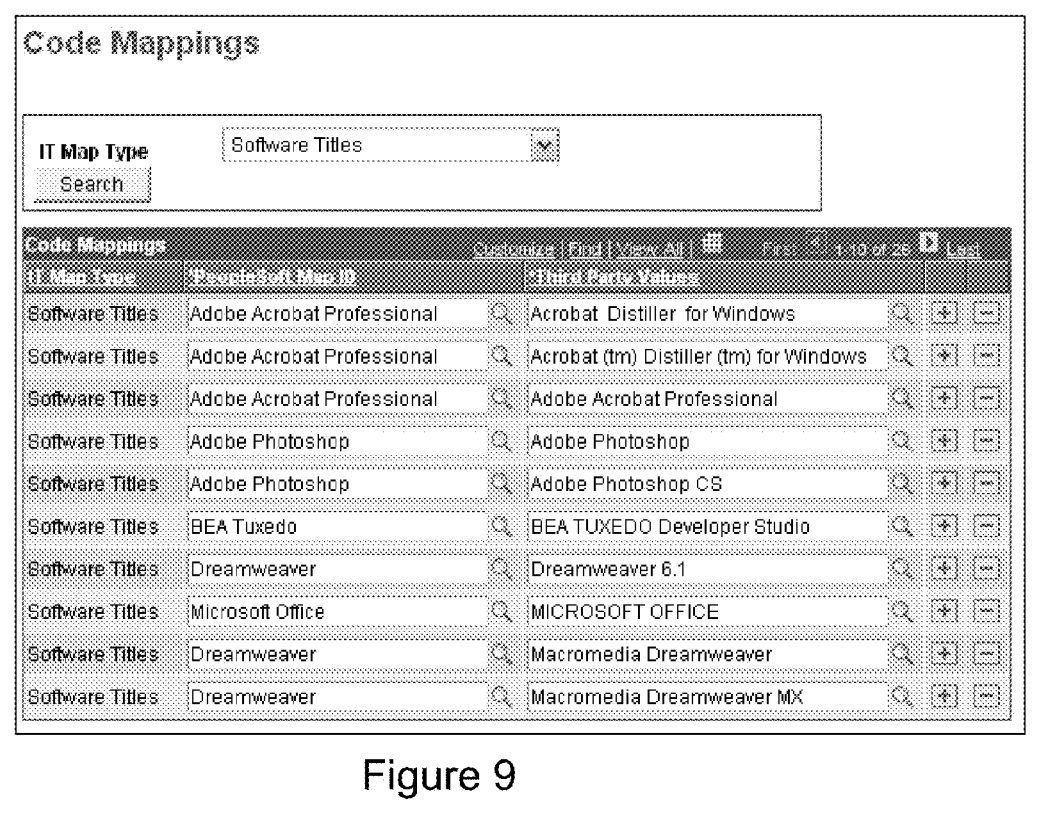

FIG. 9 shows a sample computer screen of a setup page for software titles. In the "Third Party Values" column are values for Adobe Acrobat Professional as they are stored in the Discovery systems application database. The user maps those values in the third party discovery system to the value as it is stored, for example, in the asset management system or a financial asset repository. In a specific implementation, the user defines an IT resource and software. These can be sent as parameters in the request-response Web service integration.

3. IT Resource mappings are valid. The IT_LOAD_PRE process validates that the IT resources that are in the data coming in are setup in the asset repository. These IT resources have to be defined and setup for discovery.

To fix this error, the user should ensure that the applicable IT resource value is mapped on the applicable page in the asset management system. More specifically, the user should ensure that the value of the XML node IT_RESOURCE is mapped on the IT Subtype page (asset management side). It should be an active third-party value that is listed in the grid.

Figure 10:
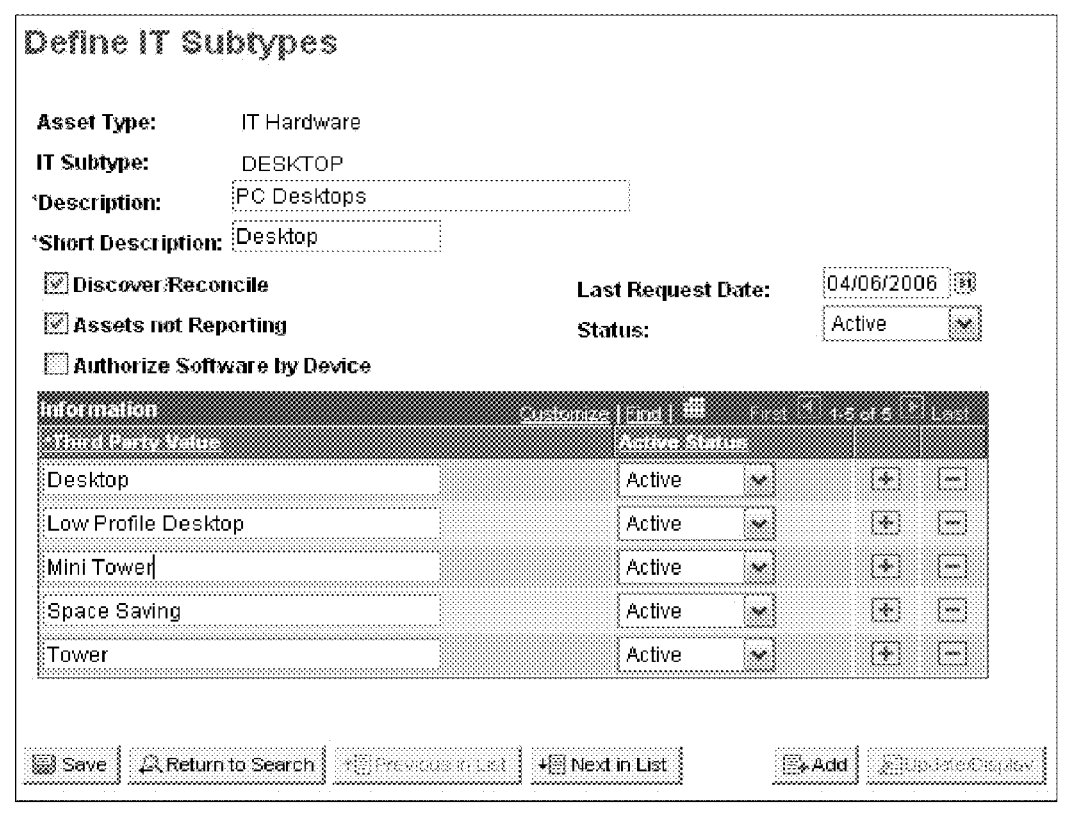

FIG. 10 shows a sample computer screen of a setup page for IT resources. In this example, in the "Third Party Value" column are values for the IT Hardware (or IT Resources) called DESKTOP. The user maps those values from the third party discovery system to the values as stored in, for example, the asset management system or a financial asset repository. In a specific implementation, the user defines IT resources and software, which can be sent as parameters to the user.

For example, an error can occur as a result of a missing definition because the user sends a "server" into the system without defining a "server" on the asset management system side. The user can add the mapping (e.g., define what a server is) and then use run control page 728 to reprocess the errors. When the user reruns the process after defining a "server," the values in the error table will then be known and the system will understand the asset data as servers. There will be no errors even though the user did not change the asset.

IT_LOAD_PRE process 720 can perform a validation of IT resources and software titles that are of interest to the user.

Depending on the discovery vendor, desktops may have different names such as desktops, low profile desktop, mini tower, space saving, or tower, but mean the same thing. In the user's application of the asset management product, the user may only care about desktops (or laptops or servers). As a result, when different types of desktops from vendors are received, the title may be normalized to represent a desktop.

The Software Title mappings and IT Resource mapping errors are typically fixed by adding the asset management system mapping and reprocessing the errors for the Batch ID. If a user chooses, however, to repopulate the prestaging tables to fix either error, the related data in the prestaging error tables can be manually deleted, then corrected and resent from the third party discovery system.

In a specific implementation, data in the prestaging tables takes precedence over the same Serial ID data in the prestaging error tables. The assumption is that newer data for the Serial ID resides in the prestaging tables.

In another specific implementation, IT_LOAD_PRE process 720 performs additional edits or performs edits in a different sequence.

This error checking and data validation is not necessary in the request-response model because the type of data requested of the discovery applications is known. In a request-response model, the result set (response) is generated by a system, removing most elements of error. The request-response model may request discovery information for a given set of hardware, laptops, and desktops, but not servers, or the system may request information about a single software title, Microsoft Projects. Because the system in the request-response model is programmed to understand the request and query the system it is expected that only the data associated with the request is sent back.

In contrast, the third party enters asset information which was not requested into the prestaging tables via Web service 708 or user's custom program 712. As such, the asset management system may not understand the asset information received and may not know how to process it.

Data that passes the prestaging error edits from IT_LOAD_PRE 720 is loaded into staging tables 528 and IT_LOAD_PRE 720 process calls load process program 532. In a specific implementation, data in the prestaging tables is deleted when selected from the prestaging tables and loaded into the staging tables. Once the discovery data is loaded into the staging tables, the process will continue as it did in the request-response model (see FIG. 6). Load process program 532 processes the data in the staging tables and performs additional data validations, translations, and transformations of the data.

Data that passes validation by the load process 532 is written to application tables or cache tables 604. In a specific implementation, data in the staging tables is deleted when loaded to the application tables.

If the user modifies the error tables after the IT_LOAD_PRE process performs the error checking and data validation, the modified error data can be resubmitted or reprocessed via the run control page. This only applies to the errors detected in the prestaging tables. Errors detected in load process 532, however, are not reprocessed. In an implementation, load process 532 was designed based on the request-response model. To fix data errors in load process 532, the data should be fixed on the discovery data side and then reintegrated. When load process 532 sees new integration data for the same asset, it will use the new data and delete the old erroneous data stored in the load error tables.

In a specific implementation, the asset management system has unique Serial IDs in each application in order to successfully integrate the discovered assets into the system. In one embodiment, the asset management system provides a query to identify duplicate Serial IDs and runs this query to identify errors from the IT_LOAD_PRE process. The query lists the Serial IDs of the devices that contain duplicate Serial IDs.

In a specific implementation, the Web service and manual load are processed as mutually exclusive tasks. If a user elects to use both options to integrate discovery data, then the two sources of data will be processed separately. As such, the user may not be able to filter out duplicate Serial ID errors because the data validation performed by the IT_LOAD_PROC will only check for duplicate Serial IDs within the one source.

Figure 11:
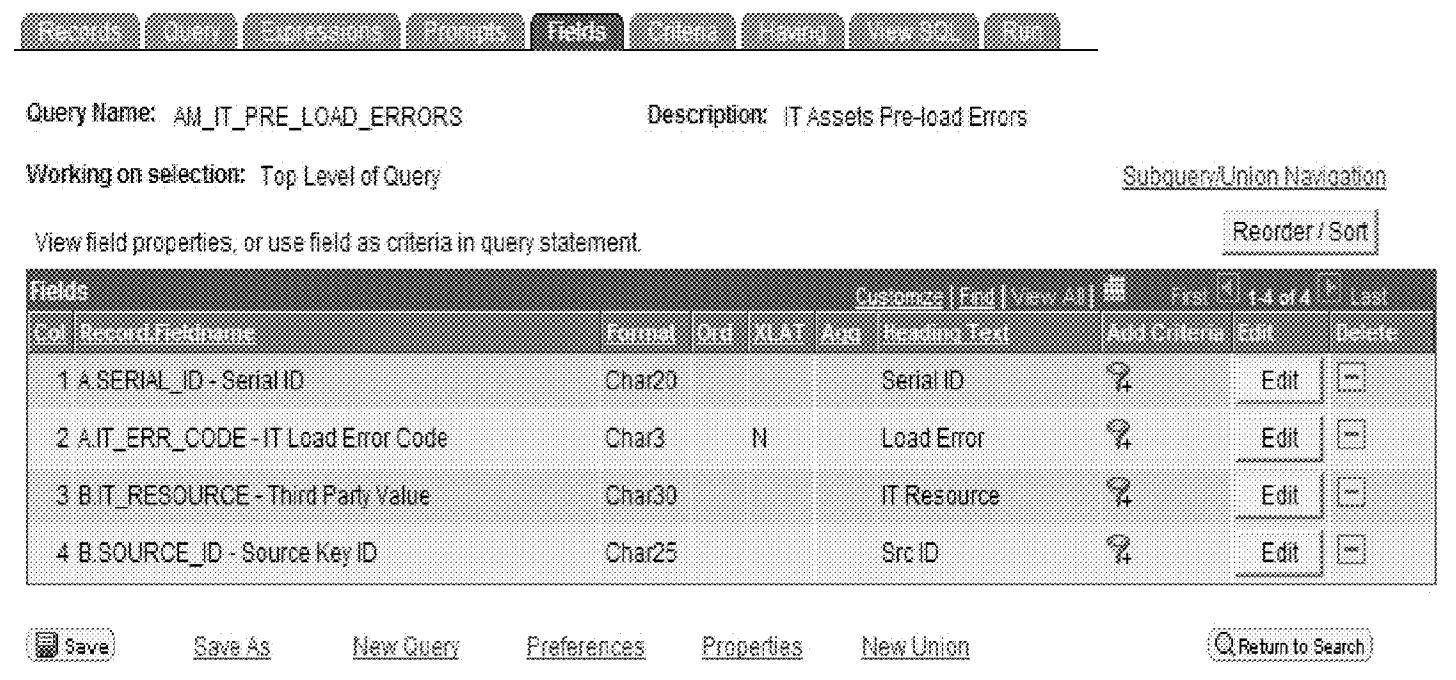

FIG. 11 shows a sample computer screen of preload errors. In a specific implementation, a query AM_IT_PRE_LOAD_ERRORS is run to retrieve a report that lists the Serial IDs of devices that fail any of the prestage error edits resulting from IT_LOAD_PRE process 720. The list identifies errors and provides the Serial ID, IT Load Error Code, Third Party Value, and Source Key ID fields.

FIG. 12 shows a sample computer screen. In a specific implementation, the user can streamline the data integration from the third-party database, through to the reconciliation processes, and additionally automatically address or remove specific exceptions. The functionality of the invention leverages existing functionality to allow a complete end-to-end process from the discovery data entering the asset management system through to reconciliation of that data against the asset repository. The process can be automated from the call of the Web service or the execution of the run control and occur in a contiguous, streamlined manner.

Selecting a Streamline Batch Process option, as shown in FIG. 12, enables the option to automatically submit (streamline) reconciliation process 612 (i.e., Compare Asset Repository) and metric engine 624 (i.e., Generate Metrics processes).

In a specific implementation, Web service 708 implements streamlined processing from a single entry point in a contiguous manner. An XML document for Web service 708 contains a node STREAMLINE_FLG that can be used to automatically submit the reconciliation process so that once the prevalidation is complete, the method can leverage the existing functionality.

In another specific implementation, the manual option performs streamlined processing if the user selects (or turns on) Streamline Batch Process on run control page 728 and the run control is set to run at regular intervals. As a result, the user can insert the data into the prestaging tables by using run control page 728 and the data will automatically flow through the rest of the system all the way to the end user.

In an embodiment, run control page 728 contains a Streamline Batch Process option that can be used to automatically submit the reconciliation process so that once the data prevalidation is completed, the method can leverage the existing functionality. Using the same Streamline Batch Process, generate metrics 624 can be automatically submitted. Additionally, business rule exceptions 616 can be configured so that they are automatically addressed removing the need for the end user to access a workbench page, which is discussed in U.S. patent application Ser. No. 11/774,969, which is incorporated by reference along with all other references cited in this application. U.S. application Ser. No. 11/848,588 discusses reconciling of asset attributes and is also incorporated by reference.

If a Process All Batch IDs check box is selected, all unique Batch IDs in the prestaging tables are processed. In a specific implementation, any existing rows in the grid are disabled. The IT_LOAD_PRE process batch program will process all data in the prestaging tables and override the Batch IDs that are specific in the grid. If there are rows in the grid where Process Errors is selected, however, the errors related to that Batch ID are also included as input for the IT_LOAD_PRE batch process.

If a Process All Errors check box is selected, all the rows in the prestaging error tables will be processed. In a specific implementation, when selected, the Process Errors check box is disabled in any existing grid row. The IT_LOAD_PRE batch program will process all data in the prestaging error table and will override the Process Errors option at the grid level.

One or more specific BATCH_IDs for the IT_LOAD_PRE process may be selected. In a specific implementation, if the Process All Batch IDs check box is selected, the Batch ID box is disabled.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   in an asset management system, receiving at a Web service a message to populate a prestaging table;
   executing the Web service to load from a discovery database a first asset entry in a first format;
   executing the Web service to translate the first asset entry from the first format to a second format;
   executing the Web service to store the first asset entry in the second format in the prestaging table; and
   comparing data comprising the first asset entry to asset data in a repository, via a reconciliation process to identify exceptions based on one or more business rules;
   wherein in response to finding exceptions, the reconciliation process outputs a manage exceptions page to allow user action thereon.

2. The method of claim 1 wherein the message has a parent element comprising hardware data.

3. The method of claim 1 comprising:
performing data validation on the prestaging table including the first asset entry in the second format.

4. The method of claim 1 comprising:
performing data transformation on the prestaging table including the first asset entry in the second format.

5. The method of claim 1 comprising:
performing error validation on entries of the prestaging table including the first asset entry in the second format;
for an entry of the prestaging table determined to comprise an error, storing the entry in an error table; and
for an entry of the prestaging table determined not to comprise an error, storing the entry in a staging table.

6. The method of claim 5 comprising:
displaying to a user entries in the error table;
permitting the user to make edits to correct entries in the error table; and
submitting the error table with the corrected entries to the Web service.

7. The method of claim 6 comprising:
executing the Web service on the error table with the corrected entries; and
storing the corrected entries in the staging table.

8. The method of claim 1 comprising:
in the asset management system, permitting interfacing of a custom program between the discovery database and the prestaging table;
executing the custom program to load from the discovery database a second asset entry in the first format;
executing the custom program to translate the second asset entry from the first format to the second format; and
executing the custom program to store the second asset entry in the second format in the prestaging table.

9. The method of claim 8 wherein after executing the Web service, without user intervention, performing error validation on entries of the prestaging table including the first asset entry in the second format, and
wherein after executing the custom program, only after user intervention, performing error validation on entries of the prestaging table including the second asset entry in the second format.

10. The method of claim 1 comprising:
upon request to the Web service, publishing to a requester a specification comprising services provided by the Web service.

11. The method of claim 1 wherein the Web service is executing on a server machine, coupled to a network, and the inboard message is communicated to the Web service over the network using an HTTP protocol.

12. The method of claim 1 wherein the Web service is executing on a server machine, coupled to a network, and the inboard message is communicated to the Web service over the network using a SOAP protocol.

13. The method of claim 12 wherein the Web service is executing on a server machine, coupled to a network, and the inboard message is communicated to the Web service in a XML format.

14. The method of claim 1 further comprising:
performing error validation on entries of the prestaging table including the first asset entry in the second format;
for an entry of the prestaging table determined not to comprise an error, storing the entry in a staging table;
performing at least data validation on data stored in the staging table; and
after the data has been validated, loading the data from the staging table into an application table.

15. An asset management system comprising:
a prestaging data table, residing on a disk of the system, to store first information in a first format;
a Web service interface to the prestaging data table, executing on a server of the system, to accept second information in a second format, different from the first format,
wherein upon a request from a requestor to the Web service over a network connection, the Web service makes available the second format to the requestor over the network connection,
wherein upon receiving second information in the second format, the Web service creates first row-sets compatible with the first format, the row-sets comprising the second information and stores the row-sets in the prestaging data table;
a user-custom program interface to the prestaging data table, through which the prestaging data table accepts and stores third information, initially provided to the user-custom program interface in a third format different from the first format and subsequently converted into second row-sets compatible with the first format;
a load process to perform error validation on entries of the prestaging table including the first asset entry in the second format;
wherein for an entry of the prestaging table determined not to comprise an error, the load process stores the entry in a staging table;
wherein the load process performs at least data validation on data stored in the staging table and after the data has been validated, loads the data from the staging table into an application table; and
a reconciliation process comparing data in the application table to asset data in a repository, to identify exceptions based on one or more business rules;
wherein in response to finding exceptions, the reconciliation process outputs a manage exceptions page to allow user action thereon.

16. The system of claim 15 wherein the Web service does not make available the first format to the requestor.

17. The system of claim 15 wherein the second information comprises information technology assets gathered by automated network discovery, each of the information technology assets being physically connected to a data network.

18. The system of claim 15 wherein the second format is the same as the third format.

19. The system of claim 15 comprising:
a run control page interface, wherein upon storing of a plurality of the first row-sets in the prestaging data table, via the run control page interface, initiating an error checking process on the first row-sets without user intervention, and upon storing of a plurality of the second row-sets in the prestaging data table, not initiating the error checking process on the second row-sets until initiated by a user.

20. The system of claim 19 wherein the run control page interface is accessible by the user from a terminal, remote from a machine comprising the disk where the prestaging data table resides, and a first graphical user interface screen provided by run control page interface comprises:
a run button through which the user can select to indicate starting of the error checking process;
a text box through which the user can input a batch identifier representative of the second row-set; and
a streamline batch process option which when not selected, upon detecting errors during the error check process, allowing the user to correct each error, and when selected, upon detecting errors during the error check process, automatically correcting at least one of the errors without user intervention.

21. The system of claim 15 wherein the second format is an XML format.

22. One or more non-transitory computer-readable media comprising software stored in memory, the software comprising instructions to one or more processors for execution, the instructions comprising:
   instructions to receive at a Web service a message to populate a prestaging table;
   instructions to execute the Web service to load from a discovery database a first asset entry in a first format;
   instructions to execute the Web service to translate the first asset entry from the first format to a second format;
   instructions to execute the Web service to store the first asset entry in the second format in the prestaging table; and
   instructions to compare data comprising the first asset entry to asset data in a repository, via a reconciliation process to identify exceptions based on one or more business rules;
   instructions responsive to finding exceptions, to the reconciliation process to output a manage exceptions page to allow user action thereon.

23. The one or more non-transitory computer-readable media of claim 22 wherein the software comprises additional instructions to:
   perform error validation on entries of the prestaging table including the first asset entry in the second format;
   for an entry of the prestaging table determined not to comprise an error, store the entry in a staging table;
   perform at least data validation on data stored in the staging table; and
   after the data has been validated, load the data from the staging table into an application table.

24. The one or more non-transitory computer-readable media of claim 22 wherein the software comprises additional instructions to:
   perform error validation on entries of the prestaging table including the first asset entry in the second format;
   for an entry of the prestaging table determined to comprise an error, store the entry in an error table; and
   for an entry of the prestaging table determined not to comprise an error, store the entry in a staging table.

25. The one or more non-transitory computer-readable media of claim 22 wherein the prestaging data table is a first prestaging data table comprising hardware information technology assets and wherein the software comprises additional instructions to use:
   a second prestaging data table, comprising software information technology assets, wherein the second prestaging data table resides on a disk.

* * * * *

UNITED STATES PATENT AND TRADEMARK OFFICE
CERTIFICATE OF CORRECTION

PATENT NO. : 8,397,128 B1  
APPLICATION NO. : 12/432163  
DATED : March 12, 2013  
INVENTOR(S) : Alonzo et al.

Page 1 of 1

It is certified that error appears in the above-identified patent and that said Letters Patent is hereby corrected as shown below:

On Title page 2, in column 1, under "Other Publications", line 6, before "U.S. Appl. No." delete "Copy of".

In the Specifications:

In column 12, line 56, delete "-s ee" and insert -- -see --, therefor.

In column 14, line 6, delete "critieria." and insert -- criteria. --, therefor.

In column 16, line 17, delete "<DISCOVERY_DATE>" and insert -- <DISCOVERY_DATE/> --, therefor.

In column 16, line 25, delete "<DISCOVERY_DATE>" and insert -- <DISCOVERY_DATE/> --, therefor.

In column 16, line 54, delete "<DISCOVERY_DATE>" and insert -- <DISCOVERY_DATE/> --, therefor.

In column 16, line 63, delete "<DISCOVERY_DATE>" and insert -- <DISCOVERY_DATE/> --, therefor.

In column 17, line 29, delete "RUN_CTRL_ID," and insert -- RUN_CNTL_ID, --, therefor.

Signed and Sealed this  
Second Day of July, 2013

Teresa Stanek Rea  
*Acting Director of the United States Patent and Trademark Office*